United States Patent [19]

Eichenauer et al.

[11] Patent Number: 4,960,822
[45] Date of Patent: Oct. 2, 1990

[54] THERMOPLASTIC MOULDING COMPOUNDS WITH GOOD PROCESSING PROPERTIES AND GREAT TOUGHNESS

[75] Inventors: Herbert Eichenauer; Edgar Leitz, both of Dormagen; Karl-Heinz Ott, Leverkusen; Alfred Pischtschan, Kuerten-Eichhof, all of Fed. Rep. of Germany

[73] Assignee: Bayer Aktiengesellschaft, Leverkusen, Fed. Rep. of Germany

[21] Appl. No.: 319,275

[22] Filed: Mar. 6, 1989

[30] Foreign Application Priority Data

Mar. 17, 1988 [DE] Fed. Rep. of Germany ....... 3808844

[51] Int. Cl.$^5$ ..................... C08L 69/00; C08L 55/02; C08L 51/04; C08L 35/00
[52] U.S. Cl. ........................................ 525/67; 525/92; 525/186; 525/413; 525/415
[58] Field of Search ...................... 525/67, 74, 186, 92

[56] References Cited

U.S. PATENT DOCUMENTS 3,639,503  2/1972  Matzer ................................ 525/415

Primary Examiner—Melvyn I. Marquis
Assistant Examiner—David Buttner
Attorney, Agent, or Firm—Connolly and Hutz

[57] ABSTRACT

Thermoplastic moulding compounds containing
(A) from 5 to 90 parts by weight of one or more thermoplastic polymers,
(B) from 5 to 90 parts by weight of one or more graft polymers and
(C) from 0.25 to 40 parts by weight of a copolymer having a sequential structure corresponding to the idealized formula (I)

$$(A-X-B)_n \qquad (I)$$

wherein
A = a polymer of a cyclic carbonate,
B = a polymer of another cyclic ester and
X = a middle member containing both partial structures of A and B.

6 Claims, No Drawings

THERMOPLASTIC MOULDING COMPOUNDS WITH GOOD PROCESSING PROPERTIES AND GREAT TOUGHNESS

ABS polymers are distinguished by a balanced combination of toughness, dimensional stability under heat, processability and surface quality. When ABS polymers are manufactured to have special properties such as exceptional toughness or high dimensional stability under heat, these desirable properties generally can only be obtained at the expense of other properties.

One particular problem is the preparation of ABS products with very high notched impact strength.

Both methods employed in practice, namely (a) increasing the graft rubber content and (b) increasing the molecular weight of the styrene/acrylonitrile copolymer (resin matrix) as well as combinations thereof result in a sharp increase in the melt viscosity (i.e. a marked deterioration in the thermoplastic processability), and this is accompanied by surface defects.

It has now been found that ABS polymers which have great toughness and at the same time excellent processing properties may be obtained by the addition of a specific sequentially structured copolymer.

This invention relates to thermoplastic moulding compounds comprising (A) from 5-90 parts by weight, preferably from 10-80 parts by weight and most preferably from 20-75 parts by weight of one or more thermoplastic polymers of styrene, α-methylstyrene, styrene substituted in the nucleus, methylmethacrylate, acrylonitrile, methacrylonitrile, maleic acid anhydride, N-substituted maleimide, vinyl acetate and mixtures thereof (B) from 5-90 parts by weight, preferably from 10-80 parts by weight and most preferably from 15-60 parts by weight of one or more graft polymers of (B.1) from 5-90 parts by weight, preferably from 30-80 parts by weight of styrene, α-methylstyrene, styrene substituted in the nucleus, methylmethacrylate, acrylonitrile, methacrylonitrile, maleic acid anhydride, N-substituted maleimide, vinyl acetate or mixtures thereof on (B.2) from 95-10 parts by weight, preferably from 70-20 parts by weight, of a rubber having a glass temperature $\leq 10°$ C. and (C) from 0.25-40 parts by weight, preferably from 0.5-30 parts by weight, of a sequentially structured copolymer corresponding to the idealized formula (I)

$$(A-X-B)_n \qquad (I)$$

wherein n=1 to 20, preferably 1 to 10 and A=a polymer of a cyclic carbonate corresponding to formula (II) ("Block A")

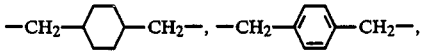

wherein
$R^1 =$ —$(CH_2)_n$— where n=3-12, —$CH_2CH_2CH(CH_3)$—, —$CH_2CH_2OCH_2CH_2$—,
—$CH_2CH_2OCH_2CH_2OCH_2CH_2$—,
—$CH_2CH(CH_3)CH_2CH_2C(CH_3)_2CH_2$—,

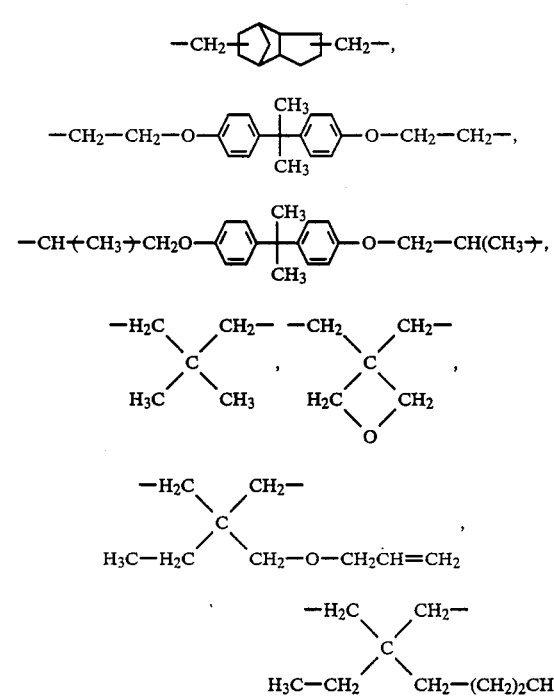

or corresponding to formula (III)

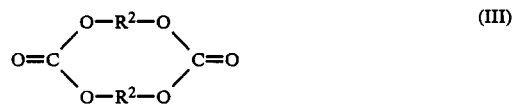

wherein
$R^2 =$ —$(CH_2)_n$— where n=4-12, —$CH_2C$-$H_2OCH_2CH_2$— —$CH_2CH_2OCH_2CH_2OCH_2C$-$H_2$—

B=a polymer of a cyclic ester corresponding to formula (IV) ("Block B")

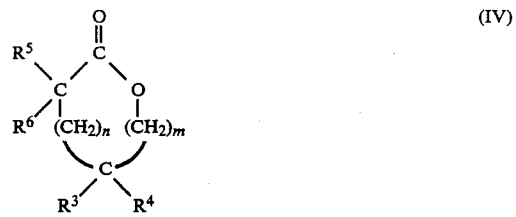

wherein
$R^3$, $R^4$, $R^5$ and $R^6$=H, $C_1$-$C_6$-alkyl, $C_3$-$C_6$-alkenyl, $C_1$-$C_6$-alkoxy or $C_1$-$C_6$-alkenoxy-$C_1$-$C_6$-alkyl, in particular H, $CH_3$ or $C_2H_5$ and m and n denote, independently of one another, 0, 1, 2, 3, 4, 5 or 6, and X=a middle member containing both the cyclic carbonate corresponding to formula (II) and/or (III) and the cyclic ester corresponding to formula (IV) in polymerized form, the concentration of the structural units of compounds (II) and/or (III) decreasing continuously in the direction of -B- and the concentration of the structural units of compound (IV) decreasing continuously in the direction of -A- ("tapered structure") and the proportion of blocks A amounting to from 47.5 to 99% by weight, preferably from 50 to 95% by weight (based on the total quantity of blocks A+B), the proportion of blocks B amounting to from 52.5 to 1% by weight, preferably from 50 to 5% by weight (based on the total quantity of blocks A+B) and the proportion of middle members X amounting to from 5 to 95% by weight, preferably from 10 to 80% by weight (based on the total quantity of A+B+X).

The invention further relates to moulding compounds containing, in addition to (A)+(B)+(C), from 1 to 40 parts by weight (based on 100 parts by weight of (A)+(B)+(C) of a linear aliphatic polycarbonate (D).

The mixtures according to the invention of copolymer, graft polymer, sequentially structured copolymer and optionally linear aliphatic polycarbonate may contain conventional additives such as flame-retardants, stabilizers, mould release agents, pigments, lubricants, antistatic agents and fillers in the usual quantities.

The addition of sequential copolymer (C) results in moulding compounds of the ABS type which are not only very tough but also have improved fluidity and can therefore be processed more readily. This means that even injection moulded parts of large dimensions or with a complicated shape, such as computer housings and automobile parts, can be produced more readily and with less exposure to elevated temperatures owing to the improved flowability of the compounds.

Thermoplastic polymers (A) include polymers of styrene, α-methylstyrene, p-methylstyrene, vinyl toluene, halogenated styrene, methyl acrylate, methyl methacrylate, acrylonitrile, methacrylonitrile, maleic acid anhydride, N-substituted maleimide, or mixtures thereof.

The thermoplastic polymers (A) are resinous, theroplastic and free from rubber. Particularly preferred polymers (A) include those obtained from styrene, methylmethacrylate, styrene/acrylonitrile mixtures, styrene/acrylonitrile/methyl methacrylate mixtures, styrene/methylmethacrylate mixtures, acrylonitrile/methylmethacrylate mixtures, α-methylstyrene/acrylonitrile mixtures, styrene-α-methylstyrene/acrylonitrile mixtures, α-methylstyrene/methylmethacrylate/acrylonitrile mixtures, styrene/α-methylstyrene/methylmethacrylate mixtures, styrene/α-methylstyrene/methylmethacrylate/acrylonitrile mixtures, styrene/maleic acid anhydride mixtures, methylmethacrylate/maleic acid anhydride mixtures and styrene/methylmethacrylate/maleic acid anhydride mixtures.

The thermoplastic polymers (A) are known and may be prepared by radical polymerization, in particular by emulsion, suspension, solution or solvent-free polymerization. They preferably have molecular weights $\overline{M}_w$ of from 20,000 to 200,000 and limiting viscosity numbers [η] of from 20 to 110 ml/g (determined in dimethylformamide at 25° C.).

Rubbers suitable as grafting bases for the preparation of the graft polymers (B) include in particular polybutadiene, butadiene/styrene copolymers, butadiene/acrylonitrile copolymers, polyisoprene, EPM rubbers (ethylene/propylene rubbers), EPDM rubbers (ethylene/propylene/diene rubbers containing, as diene, a nonconjugated diene such as hexadiene-(1,5) or norbornadiene in small quantities) and alkylacrylate rubbers based on $C_1$-$C_8$-alkylacrylates, in particular ethyl, butyl and ethylhexylacrylate.

The alkylacrylate rubbers may contain up to 30% by weight (based on the weight of rubber) of monomers such as vinyl acetate, acrylonitrile, styrene, methylmethacrylate and/or vinyl ether as copolymer components. The alkylacrylate rubbers may also contain minor quantities, preferably up to 5% by weight (based on the weight of rubber) of ethylenically unsaturated monomers which have a cross-linking action. Examples of such crosslinking agents include alkylenediol-diacrylates, and -methacrylates, polyester-diacrylates and -methacrylates, divinylbenzene, trivinylbenzene, triallylcyanurate, allylacrylate, alkylmethacrylates, butadiene and isoprene. Acrylate rubbers used as graft basis may also be core-shell products containing, as core, a cross-linked diene rubber of one or more conjugated dienes such as polybutadiene or a copolymer of a conjugated diene with an ethylenically unsaturated monomer such as styrene and/or acrylonitrile.

Diene rubbers and alkyl acrylate rubbers are preferred rubbers for the preparation of the graft polymers (B).

The rubbers are present in graft polymer (B) in the form of at least partially cross-linked particles having an average particle diameter of from 0.05 to 20.0 μm, preferably from 0.1 to 2.0 μm and most preferably from 0.1 to 0.8 μm. The term particle diameter used in this context always denotes the average particle diameter $d_{50}$ determined by ultracentrifuge measurements according to W. Scholtan et al, Kolloid-Z, u-Z. Polymere 250 (1972), 782–796.

The graft polymers (B) are prepared by radical graft polymerization of the monomers (B.1) in the presence of the rubbers (B.2) which are to be grafted.

The preferred methods of preparation of the graft polymers (B) are emulsion, solution, solvent-free and suspension polymerisation and combinations of these methods carried out in known manner. ABS polymers are particularly preferred graft polymers (B).

The sequentially structured copolymers (C) are compounds corresponding to the idealized formula (I)

$$(A-X-B)_n \qquad (I)$$

wherein n=1 to 20, in particular 1 to 10 and -A-=the polymer of a cyclic carbonate corresponding to formula (II) ("Block A")

(II)

wherein
$R^1 = -(CH_2)_n-$ where n=3-12,
$-CH_2CH_2CH(CH_3)-$, $-CH_2CH_2OCH_2CH_2-$,
$-CH_2CH_2OCH_2CH_2OCH_2CH_2-$,
$-CH_2CH(CH_3)CH_2CH_2C(CH_3)_2CH_2-$,

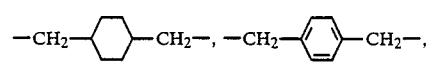

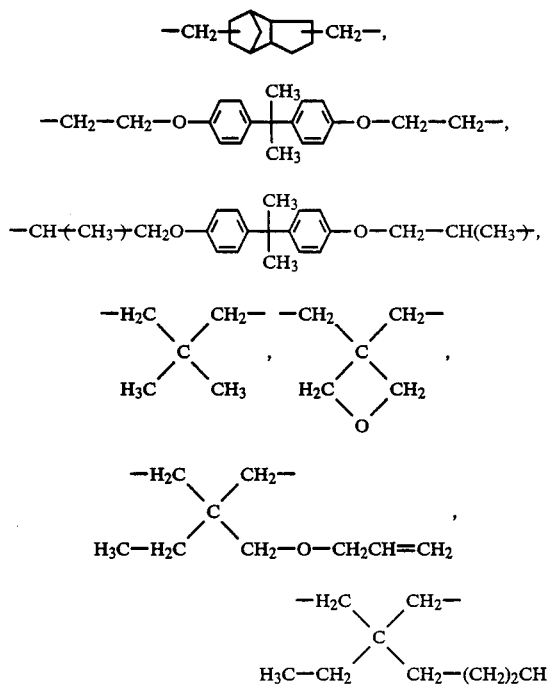

or corresponding to formula (III)

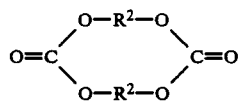

wherein
R$^2$=—(CH$_2$)$_n$— where n=4–12, —CH$_2$CH$_2$OCH$_2$CH$_2$— —CH$_2$CH$_2$OCH$_2$CH$_2$OCH$_2$CH$_2$—

B=a polymer of a cyclic ester corresponding to formula (IV) ("Block B")

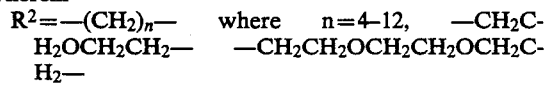

wherein
R$^3$, R$^4$, R$^5$ and R$^6$=H, C$_1$–C$_6$-alkyl, C$_1$–C$_6$-alkoxy or C$_1$–C$_6$-alkenoxy-C$_1$–C$_6$-alkyl, in particular H, CH$_3$ or C$_2$H$_5$ and m and n denote, independently of one another, 0, 1, 2, 3, 4, 5 or 6, and X=the middle member containing both the cyclic carbonate corresponding to formula (II) and/or (III) and the cyclic ester corresponding to formula (IV) in polymerized form, the concentration of the structural units of compounds (II) and/or (III) continuously decreasing in the direction of -B- and the concentration of the structural units of compounds (IV) continuously decreasing in the direction of -A- ("tapered structure").

The proportion of blocks A in polymer component (C) amounts to 47.5 to 99% by weight, preferably from 50 to 95% by weight (based on the total quantity of blocks A+B), the proportion of blocks B amounts to from 52.5 to 1% by weight, preferably from 50 to 5% by weight (based on the total quantity of blocks A+B) and the proportion of middle members X having a tapered structure amounts to from 5 to 95% by weight, preferably from 10 to 80% by weight (based on the total quantity of A+B+X).

The average molecular weights of blocks A and B range from 500 to 1,000,000, preferably from 1000 to 500,000 and most preferably from 2000 to 250,000; the average molecular weights of the middle members X amount to from 300 to 20,000, preferably from 500 to 15,000.

Preferred cyclic carbonates (II) and (III) incude trimethylene glycol carbonate, neopentyl glycol carbonate, 1,4-butanediol carbonate and dimeric carbonates of pentanediol and of hexanediol. Neopentylglycol carbonate is particularly preferred. ε-Caprolactone and pivalolactone are preferred lactones (IV).

The copolymers may be prepared from the cyclic carbonates and esters by anionic ring opening solution polymerization. A sequential structure of the copolymers is obtained by stepwise addition of the carbonate/ester mixture to the polymerisation active solution.

The products with molecular weights $\overline{M}_w$ in the range of from 2000 to 500,000, preferably from 5000 to 400,000, obtained according to DE-OS No. 37 00 193 are preferred copolymers (C) with a sequential structure.

Suitable linear aliphatic polycarbonates (D) include compounds corresponding to the general formula (V)

wherein
R$^1$ denotes the groups defined above and
x denotes an integer corresponding to a molecular weight of from 2000 to 500,000.

Polyneopentylglycol carbonate (VI) is a preferred aliphatic polycarbonate (D):

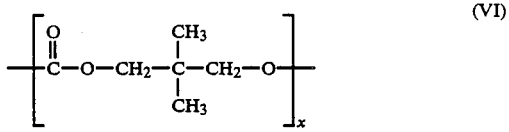

The aliphatic polycarbonates (D) may be prepared by conventional methods, e.g. by transesterification or phosgenation of diols (DE-OS No. 2 001 091, FR-PS No. 1 391 512, DE-OS No. 1 031 512, DE-OS No. 2 446 107, DE-OS No. 2 605 024, EP No. 002 641, DE-OS No. 2 447 349) but are preferably prepared by ring opening solvent-free or solution polymerization of cyclic aliphatic carbonates (DE-OS Nos. 1 545 116, 1 545 117, 3 103 135, 3 204 078).

The preferred method of preparation is the anionic ring opening solution polymerization of cyclic aliphatic carbonates at low temperatures according to DE-OS No. 3 607 625.

Cyclic aliphatic carbonates for the preparation of the aliphatic polycarbonate components in the moulding compounds according to the invention are compounds corresponding to formula (III) and/or (IV)

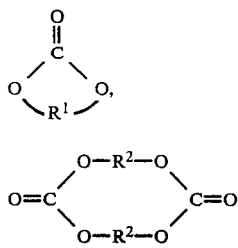

wherein $R^1$ and $R^2$ denote the group indicated above.

Carbonates corresponding to formula (III) are preferably used. Particularly preferred is the carbonate in which

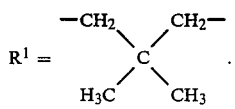

Preferred aliphatic polycarbonates (D) are the products with molecular weights $\overline{M}_w$ in the range of from 2000 to 500,000, preferably from 15,000 to 350,000, obtained according to DE-OS No. 3 607 625.

The mixtures according to the invention containing components (A), (B) and (C), optionally (D) and optionally conventional additives such as flame-retardants, lubricants, stabilizers, pigments, mould release agents, antistatic agents and fillers are prepared by mixing the components in known manner either simultaneously or successively at room temperature or at an elevated temperature and then melt compounding or melt extruding the resulting mixture at temperatures of from 150° C. to 300° C. in conventional apparatus such as internal kneaders, extruders or double shaft screws.

The moulding compounds according to the present invention may be used for the production of moulded articles of any type, using conventional production methods; in particular, moulded articles may be produced by injection moulding.

Another method of processing the moulding compounds according to the invention is the production of moulded articles by deep drawing plates or sheets which have been previously produced by known processes.

EXAMPLES

Thermoplastic resin A

Statistic styrene/acrylonitrile = 72:28 - copolymer having a $\overline{M}_w$ of about 115,000 and a non-uniformity $\overline{M}_w/\overline{M}_n$ of $-1 \leq 2.0$.

Graft polymer B

Graft product obtained by the emulsion polymerisation of 50% by weight of a styrene/acrylonitrile mixture (ratio by weight 72:28) on 50% by weight of particulate polybutadiene having an average particle diameter ($d_{50}$) of 0.4 μm.

Sequentially structured copolymer C

C 1: Sequentially structured copolymer of type A-X-B wherein A stands for polyneopentylglycol carbonate and B stands for ε-caprolactone. X denotes a "tapered" transition segment of neopentylglycol carbonate and ε-caprolactone. The copolymer was obtained by ring opening anionic copolymerization of neopentyl glycol carbonate and ε-caprolactone. The ratio by weight of the monomers neopentylglycol carbonate and ε-caprolactone in the copolymer is 93:7 (determined by $^1$H-NMR spectroscopy). The relative solution viscosity $\eta_{rel}$ of the polymer is 2.72 (2% by weight solution in $CH_2Cl_2$ at 20° C.).

C 2: Same as C 1, ratio by weight of neopentylglycol carbonate: ε-caprolactone=82:18; $\eta_{rel}$=3.17.

C 3: Same C 1, ratio by weight of neopentylglycol carbonate: ε-caprolactone=80:20; $\eta_{rel}$=3.44.

C 4: Same as C 1, ratio by weight of neopentylglycol carbonate: ε-caprolactone=61:39; $\eta_{rel}$=3.30.

C 5: Same as C 1, ratio by weight of neopentylglycol carbonate: ε-caprolactone=50:50; $\eta_{rel}$=3.10.

Polycarbonate-Component D

Aliphatic polycarbonate based on neopentylglycol (2,2-dimethylpropanediol-(1,3)) obtained by ring opening anionic polymerization of neopentylglycol carbonate having a relative solution viscosity $\eta_{rel}$ of 3.17 (2% by weight solution in $CH_2Cl_2$ at 20° C.).

Compounding of the starting components was carried out on 1.3 l internal kneader at temperatures of from 160° C. to 200° C. Production of the moulded articles was carried out in an injection moulding machine at 240° C.

The notched impact strength ($a_k$) was determined according to DIN 63 453 (unit: $kJ/m^2$) at room temperature, and the processability was determined by measuring the filling pressure required (see F. Johannaber, Kunststoffe 74 (1984), 1, pages 2-5).

The compositions of the moulding compounds investigated and the test data obtained are summarized in Table 1. Compared with comparison experiments, the compositions according to the invention have lower values for filling pressure, i.e. they have improved processability, and substantially higher levels of toughness.

TABLE 1

Compositions and test data of the moulding compounds

| Example No. | A Parts by wt. | B Parts by wt. | C1 Parts by wt. | C2 Parts by wt. | C3 Parts by wt. | C4 Parts by wt. | C5 Parts by wt. | D Parts by wt. | $a_k$ $kJ/m^2$ | Filling pressure (240° C.) bar |
|---|---|---|---|---|---|---|---|---|---|---|
| 1. | 45 | 40 | 15 | — | — | — | — | — | 21.0 | 338 |
| 2. | 45 | 40 | — | 15 | — | — | — | — | 24.1 | 338 |
| 3.* | 50 | 40 | — | — | 10 | — | — | — | 22.6 | 346 |

TABLE 1-continued
Compositions and test data of the moulding compounds

| Example No. | A Parts by wt. | B Parts by wt. | C1 Parts by wt. | C2 Parts by wt. | C3 Parts by wt. | C4 Parts by wt. | C5 Parts by wt. | D Parts by wt. | $a_k$ kJ/m² | Filling pressure (240° C.) bar |
|---|---|---|---|---|---|---|---|---|---|---|
| 4.* | 40 | 40 | — | — | 20 | — | — | — | 27.0 | 334 |
| 5.* | 60 | 30 | — | — | 10 | — | — | — | 21.1 | 324 |
| 6. | 45 | 40 | — | — | — | 15 | — | — | 27.3 | 344 |
| 7. | 45 | 40 | — | — | — | — | 15 | — | 26.7 | 326 |
| 8. | 30 | 40 | — | — | 20 | — | — | 10 | 27.3 | 318 |
| 9. | 40 | 30 | — | — | 20 | — | — | 10 | 21.1 | 287 |
| 10. Comparison* | 60 | 40 | — | — | — | — | — | — | 17.1 | 375 |
| 11. Comparison | 60 | 40 | — | — | — | — | — | — | 18.0 | 380 |

*Addition of 0.1 part by weight of a silicone oil at the compounding stage

We claim:

1. Thermoplastic moulding compounds comprising
   (A) from 5–90 parts by weight of one or more thermoplastic polymers of styrene, α-methylstyrene styrene substituted in the nucleus, methylmethacrylate, acrylonitrile, methacrylonitrile, maleic acid anhydride, N-substituted maleimide vinyl acetate, and mixtures thereof
   (B) from 5–90 parts by weight of one or more graft polymers of
   (B.1) from 5–90 parts by weight of styrene, α-methylstyrene, styrene substituted in the nucleus, methylmethacrylate, acrylonitrile, methacrylonitrile, maleic acid anhydride, N-substituted maleimide, vinyl acetate or mixtures thereof on
   (B.2) from 95 to 10 parts by weight of a rubber having a glass temperature of $\leq 10°$ C. and
   (C) from 0.25–40 parts by weight of a copolymer having an sequential structure corresponding to the idealized formula (I)

$$(A—X—B)_n \qquad (I),$$

wherein
   n=1 to 20, and A=a polymer of a cyclic carbonate corresponding to the formula (II)

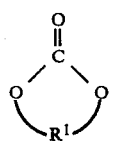

wherein
   $R^1 = —(CH_2)_n—$ where n=3–12,
   —CH₂CH₂CH(CH₃)—, —CH₂CH₂OCH₂CH₂—,
   —CH₂CH₂OCH₂CH₂OCH₂CH₂—,
   —CH₂CH(CH₃)CH₂CH₂C(CH₃)₂CH₂—,

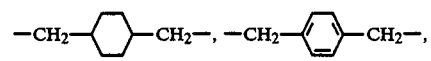

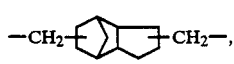

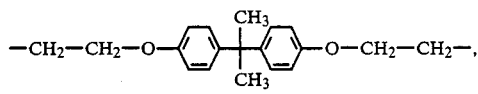

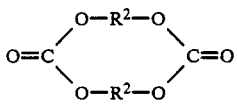

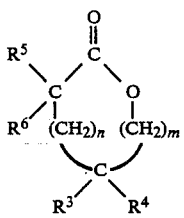

or corresponding to formula (III)

$$\begin{array}{c} O—R^2—O \\ O=C \qquad C=O \\ O—R^2—O \end{array} \qquad (III)$$

B=a polymer of a cyclic ester corresponding to formula (IV) ("Block B")

$$\begin{array}{c} R^5 \quad O \\ \quad \backslash \, \| \\ \quad C \\ R^6 \; (CH_2)_n \; (CH_2)_m \; O \\ \quad \backslash C / \\ R^3 \quad R^4 \end{array} \qquad (IV)$$

wherein
   $R^3$, $R^4$, $R^5$ and $R^6$=H, $C_1$–$C_6$-alkyl, $C_3$–$C_6$-alkenyl, $C_1$–$C_6$-alkoxy or $C_1$–$C_6$-alkenoxy-$C_1$–$C_6$-alkyl, in particular H, CH₃ or C₂H₅, and
   m and n denote, independently of one another, 0, 1, 2, 3, 4, 5 or 6,
   X=the middle member containing both the cyclic carbonate corresponding to formula (II) or (III) or both and the cyclic ester corresponding to formula (IV) in polymerized form, the concentration of the structural units of compounds (II) or (III) or both continuously decreasing in the direction of -B- and the concentration of the structural units of compounds (IV) continuously decreasing in the direction of -A- ("tapered structure"), and the proportion of blocks A amounting to from 47.5 to 99% by weight (based on the total quantity of blocks A+B), the proportion of blocks B amounting to from 52.5 to 1% by weight (based on the total quantity of blocks A+B) and the proportion of middle members X amounting to from 5 to 95% by weight (based on the total quantity of A+B+X).

2. Moulding compounds according to claim 1, containing in addition to components A+B+C, 1 to 40 parts by weight (based on 100 parts by weight of A+B+C) of a linear aliphatic polycarbonate (D).

3. Moulding compounds according to claim 1 containing as component (C), a polymer prepared by anionic ring opening polymerization.

4. Moulding compounds according to claim 2 containing as component (D), a polymer prepared by anionic ring opening polymerization.

5. Moulding compounds according to claim 1, containing as component (C), a copolymer of from 47.5 to 99% by weight of neopentylglycol carbonate and from 52.5 to 1% by weight of n-ε-caprolactone.

6. Moulding compounds according to claim 2 containing polyneopentylglycol carbonate as component (D).

* * * * *